Jan. 5, 1954
A. G. TALBERT
2,665,142
VEHICLE HAVING A REMOVABLE SECTION
Filed Nov. 22, 1950
2 Sheets-Sheet 1
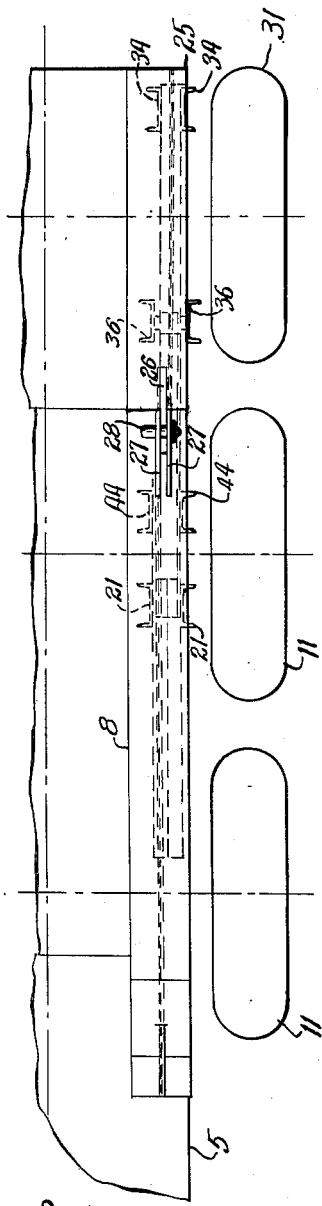
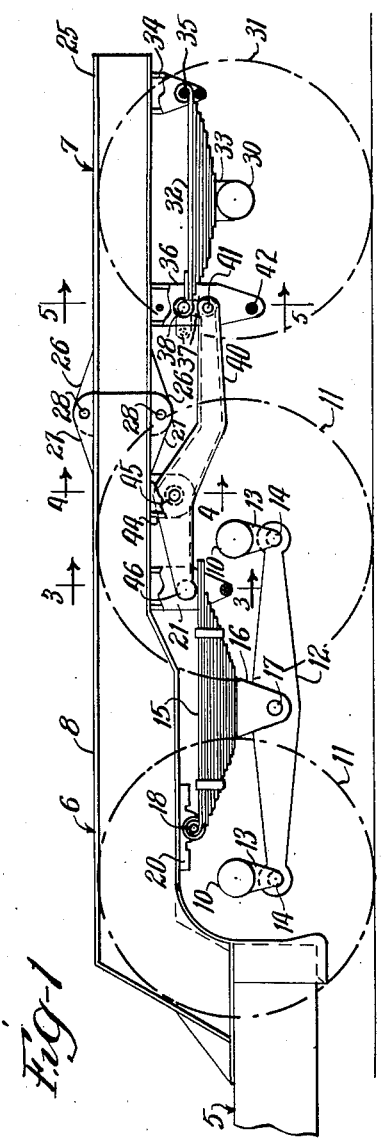
INVENTOR.
Austin G. Talbert
BY
Cromwell, Greist & Warden
Attys.

Jan. 5, 1954   A. G. TALBERT   2,665,142
VEHICLE HAVING A REMOVABLE SECTION
Filed Nov. 22, 1950   2 Sheets-Sheet 2
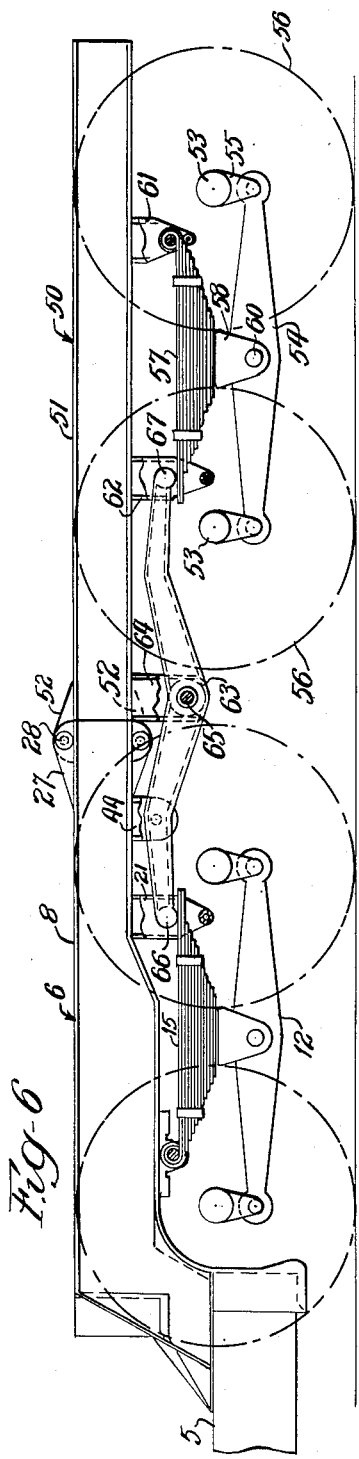
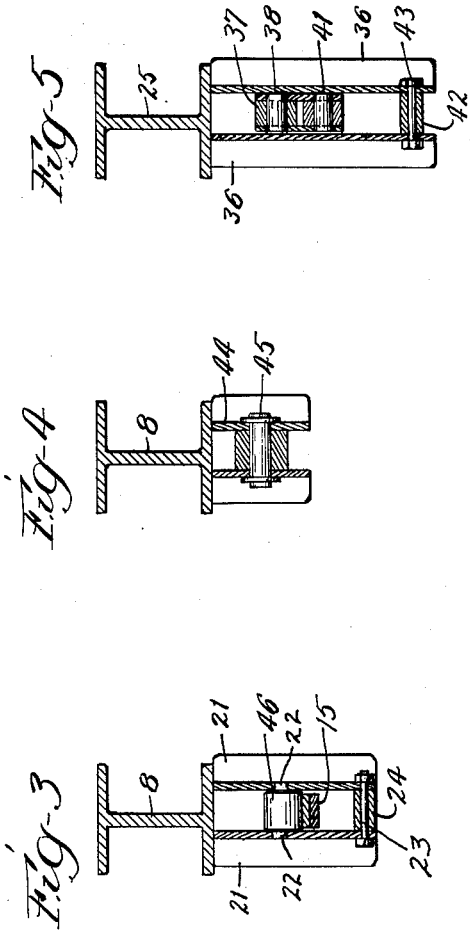
INVENTOR.
Austin G. Talbert
BY
Cromwell, Greist & Warden
Attys.

Patented Jan. 5, 1954

2,665,142

UNITED STATES PATENT OFFICE 2,665,142

VEHICLE HAVING A REMOVABLE SECTION

Austin G. Talbert, Lyons, Ill., assignor to Talbert Construction Equipment Company, Lyons, Ill., a corporation of Illinois Application November 22, 1950, Serial No. 197,017

9 Claims. (Cl. 280—104.5)

This invention relates, generally, to multi-axle, wheel-supported units for heavy-duty vehicles such as highway trucks and trailers. The invention relates particularly to such units which are provided with a removable rear section which can be easily attached or detached from a permanent front section depending upon whether or not there is a need for additional supporting wheels and axles.

In the trucking industry and construction business there is often a need for additional load-supporting wheels and axles whereby unusually heavy loads may be uniformly distributed to a greater number of wheels and axles. For example, many low-bed semi-trailers are now in use in the construction business for transporting heavy machinery such as cranes and earth movers, which themselves have low highway mobility. These heavy duty semi-trailers have bogey units on the rear ends of the type having tandem axles interconnected on opposite sides by load-distributing beams whereby the load will be evenly distributed on each wheel and axle while allowing each wheel to individually accommodate itself to irregularities in the terrain. Instances frequently arise where it is desired to transport an unusually heavy load on one of these trailers, the load being of such magnitude that the bearing pressure exerted by each wheel exceeds the permissible limit for a particular highway. Thus, most States have statutes limiting the bearing load which may be carried by each wheel of a vehicle. In other instances occasions arise in which it is desired to transport a normal load over a road or highway which is in poor condition and wherein greater than normal distribution of the load on additional axles and wheels would be highly desirable.

A principal object of the present invention is a multi-axle, wheel-supported unit for heavy-duty vehicles which has a permanent front section and a removable rear section, and includes means for distributing the load equally to the axles either when the front section is used alone or when the rear section is attached.

An important object of the invention is a multi-axle, wheel-supported unit of the class described having a permanent front section and a removable rear section having at least one additional axle, the rear section being readily removed or attached to the front section, there being no parts left projecting at the rear of the front section when the rear section is detached.

Another important object of the invention is a multi-axle, wheel supported unit having a permanent front section and a removable rear section which may be easily detached or attached to the front section, the rear section including a pair of side frame members the front ends of which abut the rear ends of a corresponding pair of side frame members for the front section, with removable connection means provided on the abutting ends whereby they may be rigidly secured together.

Another important object of the invention is a multi-axle, wheel-supported unit of the class described having a permanent front section including leaf springs on opposite sides and a removable rear section also having leaf springs on opposite sides, and a load-distributing bar on each side the front end of which is supported on the rear end of the adjacent front section leaf spring and the rear end being supported on the front end of the adjacent rear section leaf spring, and each bar being pivotally attached to the unit frame at a point such that a load on the unit is distributed proportionately between the axles in the front and rear sections.

Certain additional objects of the invention will in part be obvious, and will in part appear hereinafter.

For a more complete understanding of the nature and scope of the invention, reference may now be had to the following detailed description thereof taken in connection with the accompanying drawings, wherein:

Fig. 1 is a side elevational view of the rear end of a low-bed semi-trailer having a detachable rear section which provides one additional axle onto which the load on the trailer is proportionately distributed;

Fig. 2 is a fragmentary top plan view of the embodiment of the invention shown in Fig. 1;

Figs. 3, 4 and 5 are, respectively, enlarged vertical sectional fragmentary views taken on lines 3—3, 4—4 and 5—5 of Fig. 1;

Fig. 6 is a fragmentary side elevational view showing the rear end of a low-bed semi-trailer provided with a removable rear section which has tandem axle units and which constitutes another embodiment of the invention;

In Figs. 1 and 2 of the drawings the rear end portion of a low-bed semi-trailer is shown, the low-bed platform being designated at 5 and the permanent wheel support section at the rear end of the trailer being designated generally at 6 and having attached thereto a removable rear section which is designated generally at 7. The low-bed semi-trailer may be of the general type shown in my U. S. Patent No. 2,489,112 granted November 22, 1949.

The permanent front section includes two longitudinal side frame members 8—8 which extend along opposite sides of the section 6, only one of these members being shown in Figs. 1 and 2. These side frame members 8 are suitably attached at their front ends to the rear of the low-bed platform 5 and are suitably braced together in known manner. The permanent section 6 is supported by tandem axles 10—10. Tandem axle combinations are widely used at the present time for supporting semi-trailers. However, for the purpose of the present invention it will be understood that the permanent section 6 could be supported on a single axle or on a multiple axle combination comprising more than two axle units suitably arranged together for load equalization. Thus, referring to the construction shown in Figs. 1 and 2 for example, the detachable section 7 could become the permanent section and the permanent section 6 could become the detachable section.

Supporting wheels 11 are mounted on the opposite ends of each of the axles 10. The wheels 11 may be single wheels, as shown, or they may be dual wheels. On the inside of each of the pairs of wheels 11—11 a load-transmitting beam 12 extends between adjacent ends of the axles 10—10 and is pivotally supported or connected thereto by means of brackets or hangers 13—13, the lower ends of which are provided with pins 14 which extend through eyes provided therefor in the opposite ends of the beams 12.

The weight of the chassis is supported on the axles 10 by means of leaf springs 15—15, each of which is supported on one of the beams 12 on opposite sides of the permanent wheel-supported section 6. Each of the leaf springs 15 is carried on a saddle 16 which fits over the center of the adjacent beam 12 and is pivotally connected thereto by means of a pin 17. Each of the leaf springs 15 is pivotally connected at its front end to the underside of the adjacent frame member 8 by means of a pin 18 carried by a fixture 20 which is secured to the underside of the frame member as shown.

The rear end of each leaf spring 15 is free and extends between a pair of guide plates 21—21 (Fig. 3) which depend downwardly from the underside of the adjacent side frame member 8 as shown. The side frame members 21 are provided with registering holes 22—22 for receiving a retaining pin for the rear end of the leaf spring 15 when the removable rear section 7 is detached from the permanent front section 6. Each pair of guide plates 21 is braced apart adjacent their bottom ends by means of a collar 24 fitting over a bolt 23 which passes through the plates.

The tandem axle unit including the axles 10, supporting wheels 11, the beams 12 and leaf springs 15 is similar to known type multi-axle units. Other units which include the same essential parts with different arrangements are also available and may be adapted for use as part of the present invention.

The detachable rear section 7 includes longitudinal side frame members 25—25 which are adapted to be rigidly connected to the rear ends of the side frame members 8 so as to form rigid rearward extensions thereof. In this connection, the forward ends of the side frame members 25 which abut the rear ends of the side frame members 8 are provided at the top and bottom with male connecting flanges 26 which fit accurately in between upper and lower pairs of female connecting flanges 27—27 carried by the rear ends of the side frame members 8. The mating flanges 26 and 27 are provided with registering holes for receiving connecting pins 28—28 (Fig. 2). The detachable connections on the abutting ends of the front and rear side frame members 8 and 25 serve to rigidly connect the abutting ends together.

The rear detachable section 7 has a single supporting axle 30 on the opposite ends of which pneumatic-tired wheels 31 are mounted. A leaf spring 32 is provided on each side of the rear section 7 and is centrally mounted on the axle 30 by means of shackles 33. The rear end of each leaf spring 32 fits in between two downwardly depending plates 34—34 carried by the adjacent side frame member 25. A pin 35 extends through an eye formed on the rear end of each leaf spring unit 32 and through registering holes in the plates 34. The front end of each leaf spring 32 extends between a set of guide plates 36—36 which depend from the adjacent side frame member 25. A short link 37 is pivotally connected to the forward end of each leaf spring 32 by means of a pin 38 while the other end of each link 37 is adapted to be attached to the rear end of a load-distributing bar 40 by means of a removable pin 41. In making this latter connection, the link 37 is first lifted up to the position shown in broken line in Fig. 1 and then the rear end of the adjacent bar 40 is connected thereto by inserting the pin 41 after which the bar and link are allowed to drop in between the guide plates 36. The guide plates 36 are braced apart adjacent their lower ends by means of a collar 42 (Fig. 5) which fits over a bolt 43, as shown.

In order to distribute the loads proportionately between the tandem axles 10 of the front permanent section 8 and the single axle 30 of the detachable rear section 7, the load-distributing bars 40 on opposite sides of the unit are pivotally connected to a rigid part of the frame and at such a point between the ends of each bar 40 that the distance between the pivot support for the bar and the rear end of the bar is twice the distance between the pivot point and the front end thereof. Thus, as shown in Fig. 1 of the drawings, the bar 40 fits in between two downwardly depending plates 44—44 provided with registering holes for receiving a removable pin 45 which extends through the holes as well as through a hole provided therefor in the bar 40. The load-distributing bars 40 are so shaped that the cylindrical front ends 46 thereof ride on the top side of the rear end of the adjacent leaf spring 15 while the rear end of each bar 40 is pivotally connected to one of the links 37 carried by the front end of a leaf spring 32 as mentioned above. It will be understood that the arrangement is the same on both sides of the trailer.

With the arrangement shown in Figs. 1 and 2, any load placed on the body 5 of the trailer will be equally distributed between the axles 10—10 and the rear axle 30. At the same time each of the wheels and axles in independently mounted so that they can accommodate themselves to unevenness of terrain while still maintaining the uniform load distribution.

When the loads to be transported on the trailer are such that the additional third axle is not required, the detachable rear section 7 may be readily removed. To do this, the pins 28 are removed which secure the longitudinal side frame members 8 and 25 together, and the load-distributing bars 40 are removed by withdrawing the pins 45 and the pins 41. After the bars 40 have been removed, pins (not shown) are replaced through the registering holes 22—22 in each of the sets of side plates 21 so as to provide a holding abutment for the rear end of each leaf spring 15. It will thus be seen that the rear section 7 is easily detached or re-attached depending upon whether or not there is, or is not, a need for the additional supporting axle.

In Fig. 6 of the drawings an embodiment of the invention is shown wherein the removable rear section of the wheel-supported unit has tandem axles. The permanent front section indicated generally at 6 may be that shown in Figs. 1 and 2. If desired, the sets of plates 44—44 on opposite sides of the unit which are used for supporting the load-distributing bars 40—40 in Fig. 1 may be omitted since they will not be used unless the single axle detachable unit 7 is being used. The detachable rear section 50 includes a pair of longitudinal side frame members 51—51 provided on their front ends with male flange connectors 52—52 adapted to meet with the female flange connectors 27—27 carried on the rear ends of the front section side members 8—8. The rear section 50 is supported by tandem axles 53—53 which form a part of a unit corresponding to the tandem axle unit for the permanent front section 6. A beam 54 is supported on each side of the rear section 50 by means of hangers 55 which pivotally connect the opposite ends of the beam 54 to the axles 53. Support wheels 56—56 are mounted on opposite ends of the axles 53.

A leaf spring 57 is provided on each side of the rear section 50 and is carried over the center of the adjacent beam 54 by means of a saddle 58 pivotally connected to the beam 54 by means of a pin 60. The rear end of each leaf spring 57 is pivotally connected to and in between downwardly depending side plates 61—61 carried by the adjacent side frame member 51, as shown. The front end of each leaf spring 57 fits in between downwardly depending guide plates 62—62 carried by the adjacent frame member 51.

A load-distributing bar 63 is used on each side of the unit to transmit the load between the front and rear sections. Since there are an equal number of supporting axles in the front and rear sections, each bar 63 is pivotally connected at its mid point only to the frame. For this purpose a pair of side plates 64—64 project downwardly adjacent the front end of each of the longitudinal side frame members 51. The bars 63 fit in between these pairs of plates 64 and are pivotally connected thereto by means of pins 65. The cylindrically shaped front and rear ends 66 and 67, respectively, of the load-distributing bars 63 rest on the rear and front ends of the leaf springs 15 and 57, respectively.

When it is desired to detach the removable rear section 50, this may be done conveniently by removing the pins 28 which secure together the abutting ends of the side frame members 8 and 51 and then inserting retaining pins or bolts in the registering holes in the sets of downwardly depending guide plates 21—21 on the undersides of the front section longitudinal side frame members 8. Such pins or bolts will serve to retain the rear ends of the leaf spring units 15 after the detachable rear section 50 has been removed.

It will be seen that the pairs of support brackets 64 for the load-distributing bars 63 can be carried by either the permanent front section or the removable rear section depending upon the particular proportions. Thus, if the side frame members 8 were made somewhat longer in Fig. 6, these supporting brackets 64 could be carried adjacent the rear ends of the side frame members 8.

It will be seen that the present invention may be readily adapted to existing low-bed trailers or other wheel-supported units. For example, it is only necessary to provide such structures with the female connecting flanges 27—27 and provide downwardly sets of guide plates 21—21 and 44—44, or their equivalents.

While the invention has been described in connection with low-bed semi-trailers as illustrative of wheel-supported vehicles, it will be understood that it is also applicable to other types of vehicles including heavy-duty highway trucks and such special purpose vehicles as truck cranes.

Since certain changes may be made in the particular embodiments described above and shown in the accompanying drawings, and since other embodiments of the invention may be made without departing from the spirit and scope of the invention, it is intended that all matter described above and shown in the accompanying drawings shall be interpreted as illustrative and not in a limiting sense.

What is claimed as new is:

1. A multi-axle, wheel-supported unit of the class described having a permanent front section and a detachable rear section removably connected to said front section, comprising, a pair of longitudinal side frame members for said front section, at least one supporting axle for said front section, support wheels mounted on the opposite ends of said front section axle, spring means on each side of said front section and not extending beyond the rear ends of said front section side frame members for supporting said front section side frame members on said front section axle, a pair of longitudinal side frame members for said detachable rear section adapted to abut endwise and form rigid extensions of said front section side frame members, detachable connecting means on the abutting ends of said front and rear section side frame members for rigidly connecting the abutting side frame members together, at least one supporting axle for said detachable rear section, support wheels mounted on the opposite ends of said rear section axle, spring means for supporting said rear section side frame members on said rear section supporting axle and not extending beyond the front ends of said rear section side frame members, a load-distributing bar on each side of said wheel-supported unit having the front end of each bar supported by the adjacent front section support wheel or wheels and having the rear end of each bar supported by the adjacent rear section support wheel or wheels, bracket means on each side of said wheel-supported unit carried by one of said side frame members, and means for pivotally connecting each of said load-distributing bars on the adjacent bracket means.

2. A multi-axle, wheel-supported unit of the class described having a permanent front section and a detachable rear section removably connected to said front section, comprising, a pair of longitudinal side frame members for said front section, tandem supporting axles for said front section, support wheels mounted on the opposite ends of said tandem supporting axles, a beam on each side of said front section extending between the adjacent ends of said tandem axles, connecting means pivotally connecting the opposite ends of said beams to the adjacent ends of said tandem axles, a leaf spring on each side of said front section, means pivotally supporting each of said leaf springs at its middle and aligned in a front to rear direction on the adjacent beam, means pivotally connecting the front end of each of said leaf springs to the adjacent front section side frame member, disconnectable means for connecting the rear end of each of said leaf springs to the adjacent front section side frame member when said rear section is detached from said front section, a pair of longitudinal side frame members for said detachable rear section adapted to abut endwise and form rigid extensions of said front section side frame members, detachable connecting means on the abutting ends of said front and rear section side frame members for rigidly connecting the abutting side frame members together, at least one supporting axle for said detachable rear section, support wheels mounted on the opposite ends of said rear section axle, spring means for supporting said rear section side frame members on said rear section axle, a load-distributing bar on each side of said wheel-supported unit with the front end of each bar supported by the rear end of the adjacent one of said front section leaf springs and having the rear end of each bar supported by the adjacent end of said rear section axle, bracket means on each side of said wheel-supported unit carried by one of said side frame members, and means for pivotally connecting each of said load-distributing bars on the adjacent one of said bracket means, said front section being operable as an independent unit when said rear section is detached therefrom and the rear ends of said front section leaf springs are attached to said side frame members.

3. A multi-axle, wheel-supported unit of the class described having a permanent front section and a detachable rear section removably connected to said front section, comprising, a pair of longitudinal side frame members for said front section, tandem supporting axles for said front section, support wheels mounted on the opposite ends of said tandem supporting axles, a beam on each side of said front section extending between the adjacent ends of said tandem axles, connecting means pivotally connecting the opposite ends of said beams to the adjacent ends of said tandem axles, a leaf spring on each side of said front section, means pivotally supporting each of said leaf springs at its middle and aligned in a front to rear direction on the adjacent beam, means pivotally connecting the front end of each of said leaf springs to the adjacent front section side frame member, disconnectable means for connecting the rear end of each of said leaf springs to the adjacent front section side frame member when said rear section is detached from said front section, a pair of longitudinal side frame members for said detachable rear section adapted to abut endwise and form rigid extensions of said front section side frame members, detachable connecting means on the abutting ends of said front and rear section side frame members for rigidly connecting the abutting side frame members together, tandem supporting axles for said rear section, support wheels mounted on the opposite ends of said rear section supporting axles, a beam on each side of said rear section extending between the adjacent ends of said rear section axles, connecting means pivotally connecting the opposite ends of said rear section beams to the adjacent ends of said rear section axles, a leaf spring on each side of said rear section, means pivotally supporting each of said rear section leaf springs at its middle and aligned in a front to rear direction on the adjacent one of said rear section beams, means pivotally connecting the rear end of each of said rear section leaf springs to the adjacent rear section side frame member, a load-distributing bar on each side of said wheel-supported unit with the front end of each bar supported by the rear end of the adjacent front section leaf spring and having the rear end of each bar supported by the front end of the adjacent rear section leaf spring, bracket means on each side of said wheel-supported unit carried by one of said side frame members, and means pivotally connecting each of said bars at its middle on the adjacent one of said bracket means, said front section being operable as an independent unit when said rear section is detached therefrom and the rear ends of said front section leaf springs are attached to said side frame members.

4. A multi-axle, wheel-supported unit of the class described having a permanent front section and a detachable rear section removably connected to said front section, comprising, a pair of longitudinal side frame members for said front section, tandem supporting axles for said front section, support wheels mounted on the opposite ends of said tandem supporting axles, a beam on each side of said front section extending between the adjacent ends of said tandem axles, connecting means pivotally connecting the opposite ends of said beams to the adjacent ends of said tandem axles, a leaf spring on each side of said front section, means pivotally supporting each of said leaf springs at its middle and aligned in a front to rear direction on the adjacent beam, means pivotally connecting the front end of each of said leaf springs to the adjacent front section side frame member, a pair of longitudinal side frame members for said detachable rear section adapted to abut endwise and form rigid extensions of said front section side frame members, detachable connecting means on the abutting ends of said front and rear section side frame members for rigidly connecting the abutting side frame members together, a single supporting axle for said rear section, support wheels mounted on the opposite ends of said single axle, a leaf spring on each side of said rear section, means supporting each of said rear section leaf springs at its middle and aligned in a front to rear direction on the adjacent end of said single axle, means pivotally connecting the rear end of each of said rear section leaf springs to the adjacent rear section side frame member, a load-distributing bar on each side of said wheel-supported unit with the front end of each bar supported by the rear end of the adjacent front section leaf spring and having the rear end of each bar supported by the front end of the adjacent rear section leaf spring, bracket means on each of said front section side frame members projecting over the rear end of the adjacent front section leaf spring and adapted to be connected thereto when said connecting bars are removed, and means pivotally connecting each of said bars on the adjacent one of said bracket means, the location of said pivot connections for said bars being spaced from the front end thereof a distance equal to one-third the length of each bar.

5. The wheel-supported unit called for in claim 1 wherein said detachable connecting means on the abutting ends of said front and rear section side frame members for rigidly connecting the abutting side frame members together, comprise, male members on the abutting end of one side frame member, mating female members on the abutting end of the corresponding side frame member, and removable pins extending through registering holes in said mating male and female members.

6. The wheel-supported unit called for in claim 1 wherein each of said bracket means on opposite sides of said unit comprise inner and outer spaced plates depending from one of said side frame members having registering holes adjacent the bottom ends of said plates, and said means for pivotally connecting each of said load-distributing bars on the adjacent bracket means comprises a pin which projects through a hole in said bar and through said registering holes in said bracket plates with said bar being disposed in between said plates.

7. The wheel-supported unit called for in claim 2 wherein said disconnectable means comprises a pair of spaced guide plates depending from each of said front section side frame members and fitting over opposite sides of the rear end of each of said leaf springs, each pair of said guide plates having registering holes therein for receiving a removable pin which serves to bear down on the rear end of the adjacent leaf spring when said rear section of the unit is detached and said load-transmitting bars are removed.

8. The wheel-supported unit called for in claim 4 wherein a pair of spaced guide plates depend from each of said rear section side frame members and fit over the opposite sides of the front end of each of said rear section leaf springs, a short link pivotally connected to the front end of each of said rear section leaf springs so as to hang down between the adjacent pair of said guide plates, each of said links having an aperture in the bottom end which is registrable with an aperture in the rear end of the adjacent load-distributing bar, and a removable pin extending through the registering apertures in the bottom end of each link and the rear end of the adjacent load-transmitting bar.

9. An additional axle providing section of the class described adapted to be removably attached as the rear section of a multi-axle wheel-supported unit having a permanent front section, said additional axle providing section comprising a pair of longitudinal side frame members adapted to abut endwise and form rigid extensions of longitudinal side frame members of said permanent front section, connecting means on the front ends of said side frame members of said additional axle providing section adapted to be mated and connected with cooperating connecting means carried on the rear ends of said permanent front section, at least one supporting axle for said additional axle providing unit, support wheels mounted on the opposite ends of said axle, a leaf spring on each side of said additional axle providing section, means for supporting each of said leaf springs on the adjacent end of said supporting axle with each leaf spring extending in a front to rear direction and not extending beyond the front ends of said rear section side frame members, means for pivotally connecting the rear end of each of said leaf springs to the adjacent one of said longitudinal side frame members, and guide means on each of said side frame members for guiding the front end of the adjacent one of said leaf springs, the load on said supporting axle of said additional axle providing section when the same is attached to said permanent front section being distributable to the supporting axles of said permanent front section by means of load-distributing bars on opposite sides of said coupled sections, the rear end of each of said bars being adapted to rest on the front end of the adjacent leaf spring of said additional axle providing unit, the front end of each of said bars being adapted to rest on the adjacent leaf springs of said permanent front section.

AUSTIN G. TALBERT.

References Cited in the file of this patent

UNITED STATES PATENTS

| Number | Name | Date |
|---|---|---|
| 1,745,433 | Marcum | Feb. 4, 1930 |
| 1,754,291 | Utz | Apr. 15, 1930 |
| 1,784,268 | Buckendale et al. | Dec. 9, 1930 |
| 1,857,249 | Marcum | May 10, 1932 |
| 1,891,399 | Ahlm et al. | Dec. 20, 1932 |
| 1,981,593 | Fageol | Nov. 20, 1934 |
| 2,067,861 | Robin | Jan. 12, 1937 |